United States Patent
Nakahara et al.

(10) Patent No.: US 10,727,722 B2
(45) Date of Patent: Jul. 28, 2020

(54) STATOR, STATOR MANUFACTURING METHOD AND MOTOR

(71) Applicant: Nidec Corporation, Kyoto (JP)

(72) Inventors: Yasuaki Nakahara, Kyoto (JP); Takayuki Migita, Kyoto (JP); Hiroshi Kitagaki, Kyoto (JP); Takeshi Honda, Kyoto (JP); Hisashi Fujihara, Kyoto (JP)

(73) Assignee: NIDEC CORPORATION, Kyoto (JP)

( * ) Notice: Subject to any disclaimer, the term of this patent is extended or adjusted under 35 U.S.C. 154(b) by 0 days.

(21) Appl. No.: 16/282,468

(22) Filed: Feb. 22, 2019

(65) Prior Publication Data

US 2019/0190356 A1 Jun. 20, 2019

Related U.S. Application Data

(63) Continuation of application No. PCT/JP2017/031388, filed on Aug. 31, 2017.

(30) Foreign Application Priority Data

Sep. 2, 2016 (JP) .................................. 2016-172340

(51) Int. Cl.
*H02K 1/16* (2006.01)
*H02K 15/02* (2006.01)
(Continued)

(52) U.S. Cl.
CPC ........... *H02K 15/024* (2013.01); *H02K 1/165* (2013.01); *H02K 1/18* (2013.01); *H02K 3/12* (2013.01);
(Continued)

(58) Field of Classification Search
CPC .................................. H02K 1/148; H02K 1/16
See application file for complete search history.

(56) References Cited

U.S. PATENT DOCUMENTS

| | | | |
|---|---|---|---|
| 6,169,350 B1 * | 1/2001 | Yang ........................ | H02K 1/14 310/13 |
| 6,369,687 B1 | 4/2002 | Akita et al. | |

(Continued)

FOREIGN PATENT DOCUMENTS

| | | |
|---|---|---|
| JP | 07-222383 A | 8/1995 |
| JP | 2000-078779 A | 3/2000 |

(Continued)

OTHER PUBLICATIONS

Official Communication issued in International Patent Application No. PCT/JP2017/031388, dated Oct. 31, 2017.

(Continued)

*Primary Examiner* — Dang D Le
(74) *Attorney, Agent, or Firm* — Keating & Bennett

(57) ABSTRACT

A stator includes core pieces in which at least first and second laminate members are laminated, the first laminate member includes a first tooth portion and a first core back portion, the second laminate member includes a second tooth portion and a second core back portion, the first core back portion includes a first protrusion on one side thereof in a circumferential direction and a first recess on the other side thereof in the circumferential direction, the second core back portion includes a second recess on one side thereof in a circumferential direction and a second protrusion on the other side thereof in the circumferential direction, and an area of a region in which the first and second core back portions of the core piece adjacent thereto overlap in a lamination direction is greater than a circumferential cross-sectional area of the first core back portion circumferentially inward from the first protrusion.

15 Claims, 12 Drawing Sheets

(51) Int. Cl.
  *H02K 15/095* (2006.01)
  *H02K 1/18* (2006.01)
  *H02K 3/12* (2006.01)
  *H02K 3/28* (2006.01)

(52) U.S. Cl.
  CPC ............... *H02K 3/28* (2013.01); *H02K 15/02* (2013.01); *H02K 15/095* (2013.01)

(56) References Cited

U.S. PATENT DOCUMENTS

| | | | |
|---|---|---|---|
| 6,538,548 | B2 | 3/2003 | Akita et al. |
| 6,946,769 | B2 | 9/2005 | Yamamura et al. |
| 6,960,861 | B2* | 11/2005 | Yoneda .................. H02K 1/148 310/216.012 |
| 7,120,985 | B2* | 10/2006 | Nouzumi ................ H02K 1/148 29/596 |
| 7,340,822 | B2 | 3/2008 | Yamamura et al. |
| 7,667,367 | B2* | 2/2010 | Matsuo .................. H02K 1/148 310/216.008 |
| 7,965,014 | B2* | 6/2011 | Shinagawa ............. H02K 1/148 310/216.024 |
| 8,643,246 | B2* | 2/2014 | Allen ....................... H02K 1/16 310/216.011 |

FOREIGN PATENT DOCUMENTS

| | | |
|---|---|---|
| JP | 2000-201457 A | 7/2000 |
| JP | 2003-224939 A | 8/2003 |
| JP | 2004-357349 A | 12/2004 |
| JP | 2005-039992 A | 2/2005 |
| JP | 2005-110464 A | 4/2005 |
| JP | 2005-341684 A | 12/2005 |
| JP | 2006-081278 A | 3/2006 |
| JP | 2006-121818 A | 5/2006 |
| JP | 2006-271091 A | 10/2006 |
| JP | 2006-304460 A | 11/2006 |
| JP | 2007-049807 A | 2/2007 |
| JP | 2007-228720 A | 9/2007 |
| JP | 2008-199854 A | 8/2008 |
| JP | 2009-296771 A | 12/2009 |
| JP | 2015-107031 A | 6/2015 |

OTHER PUBLICATIONS

Nakahara et al., "Stator, Stator Manufacturing Method and Motor", U.S. Appl. No. 16/170,170, filed Oct. 25, 2018.
Nakahara et al., "Stator, Stator Manufacturing Method and Motor", U.S. Appl. No. 16/282,470, filed Feb. 22, 2019.
Nakahara et al., "Stator, Stator Manufacturing Method and Motor", U.S. Appl. No. 16/282,471, filed Feb. 22, 2019.
Nakahara et al., "Stator, Stator Manufacturing Method and Motor", U.S. Appl. No. 16/282,473, filed Feb. 22, 2019.

* cited by examiner

STATOR, STATOR MANUFACTURING METHOD AND MOTOR

CROSS REFERENCE TO RELATED APPLICATIONS

This application claims the benefit of priority to Japanese Patent Application No. 2016-172340 filed on Sep. 2, 2016 and is a Continuation Application of PCT Application No. PCT/JP2017/031388 filed on Aug. 31, 2017. The entire contents of each application are hereby incorporated herein by reference.

BACKGROUND OF THE INVENTION

1. Field of the Invention

The present invention relates to a stator, a stator manufacturing method and a motor.

2. Description of the Related Art

A stator of a motor includes a plurality of teeth radially installed thereon, and an annular part connecting radially outer sides of the teeth in an annular shape. In the stator, an inclined part is formed on an end portion of each core piece of each divided laminate core, and pairs of core pieces with different shapes are alternately laminated with one another. However, in the conventional stator mentioned above, one goal has been to mitigate concentration of magnetic flux to prevent magnetic flux saturation, and sufficient magnetic flux in a lamination direction has not yet been obtained.

SUMMARY OF THE INVENTION

According to an example preferred embodiment of the present invention, a stator includes an annular core with a center that is a vertically extending central axis around which a conductive wire is wound, in which the core includes core pieces in which at least a first laminate member and a second laminate member are laminated, the first laminate member includes a first tooth portion extending in a radial direction and a first core back portion connected to a radially outer side of the first tooth portion and extending in a circumferential direction, the second laminate member includes a second tooth portion extending in the radial direction and a second core back portion connected to a radially outer side of the second tooth portion and extending in the circumferential direction, the first core back portion includes a first protrusion provided on one side thereof in the circumferential direction and a first recess provided on the other side thereof in the circumferential direction, the second core back portion includes a second recess provided on one side thereof in the circumferential direction and a second protrusion provided on the other side thereof in the circumferential direction, and an area of a region in which the first core back portion and the second core back portion of the core piece adjacent to the first core back portion overlap in a lamination direction is greater than a circumferential cross-sectional area of the first core back portion circumferentially inward from the first protrusion.

The above and other elements, features, steps, characteristics and advantages of the present disclosure will become more apparent from the following detailed description of the example embodiments with reference to the attached drawings.

DETAILED DESCRIPTION OF THE PREFERRED EMBODIMENTS

Figure 1:
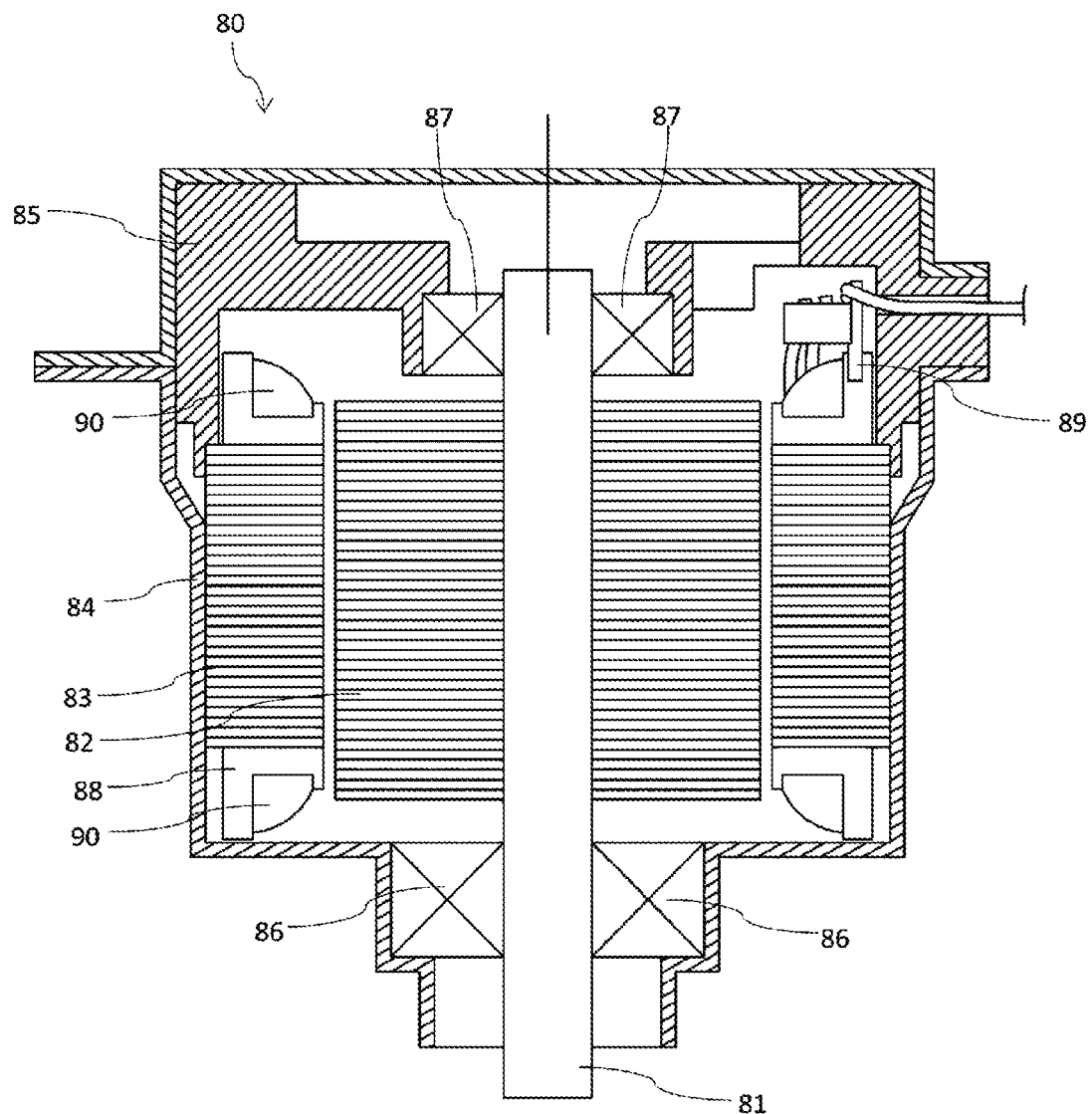
FIG. 1 is a cross-sectional view of a motor according to an example embodiment of the present disclosure.

Hereinafter, example embodiments of the present disclosure will be described in detail with reference to the accompanying drawings. The embodiments described below are only exemplary examples of the present invention, but the technical scope is not limited thereby. Further, the same reference numerals may be assigned to the same components, and the descriptions thereof may be omitted.

The exemplary embodiments of the present invention relate to a configuration of a stator (also referred to as a "stator core") used in a motor and a method of manufacturing the stator. In the description, the term "core piece" refers to an element including a tooth portion around which a conductive wire is not wound and a core back portion having an annular shape in a connected state. The term "core" refers to a group of a plurality of annularly connected core pieces. The term "divided stator" refers to a core piece around which the conductive wire is wound. The term "stator" refers to a group of a plurality of divided stators in an annularly connected state. Further, each layer of the core piece, which defines the core piece by being laminated, refers to a "laminate member." Further, the term "laminate member" does not necessarily refer to only a layer of the member of the core piece, but may include a plurality of layers of the members having the same or similar shapes and consecutively laminated.

Further, for convenience of description in the specification, in laminate members laminated in a manufacturing process, a direction in which the laminate members are laminated refers to an "upper side" or an "upper direction," and a direction in which laminate members, which are already laminated, are positioned refers to a "lower side" or a "lower direction." In most cases, the lower side opposing the upper side is positioned on a lower side in a gravity direction. Further, a direction in which the laminate members composing the core piece are laminated refers to a "lamination direction." In the following description, the lamination direction is parallel to a central axis of rotation of the motor, but the lamination direction and the central axis are not necessarily parallel to each other.

FIG. 1 is a cross-sectional view of a motor 80 of one embodiment of the present invention. As shown in FIG. 1, the motor 80 preferably includes a shaft 81, a rotor 82, a stator 83, a housing 84, a bearing holder 85, a first bearing 86, a second bearing 87, an insulator 88, a coil-drawing line 89, a coil 90, and the like. The shaft 81 and the rotor 82 are integrated with each other by, for example, the shaft 81 being press fit through the rotor 82. The shaft 81 has a cylindrical shape having a center that is a central axis extending in one direction. The rotor 82 is positioned at a middle of the shaft 81. The rotor 82 is rotatable about the stator 83. The stator 83 is disposed to surround the rotor 82 in an axial direction. The stator 83 includes the coil 90 which is preferably formed by winding a conductive wire around the core of the stator 83. The housing 84 is engaged with an outer circumferential surface of the stator 83 and accommodates the shaft 81, the rotor 82, the stator 83, the bearing holder 85, the first bearing 86, the second bearing 87, the insulator 88, the coil-drawing line 89, and the coil 90 which compose the motor 80. The bearing holder 85 supports the second bearing 87. The bearing holder 85 is engaged with the housing 84. The first bearing 86 is preferably disposed at a lower portion of the housing 84 and supports one side of the shaft 81. The second bearing 87 supports the other side of the shaft 81. The insulator 88 is disposed between the stator 83 and a conductive wire of the coil 90 to insulate the stator 83 and the conductive wire of the coil 90.

Figure 2:
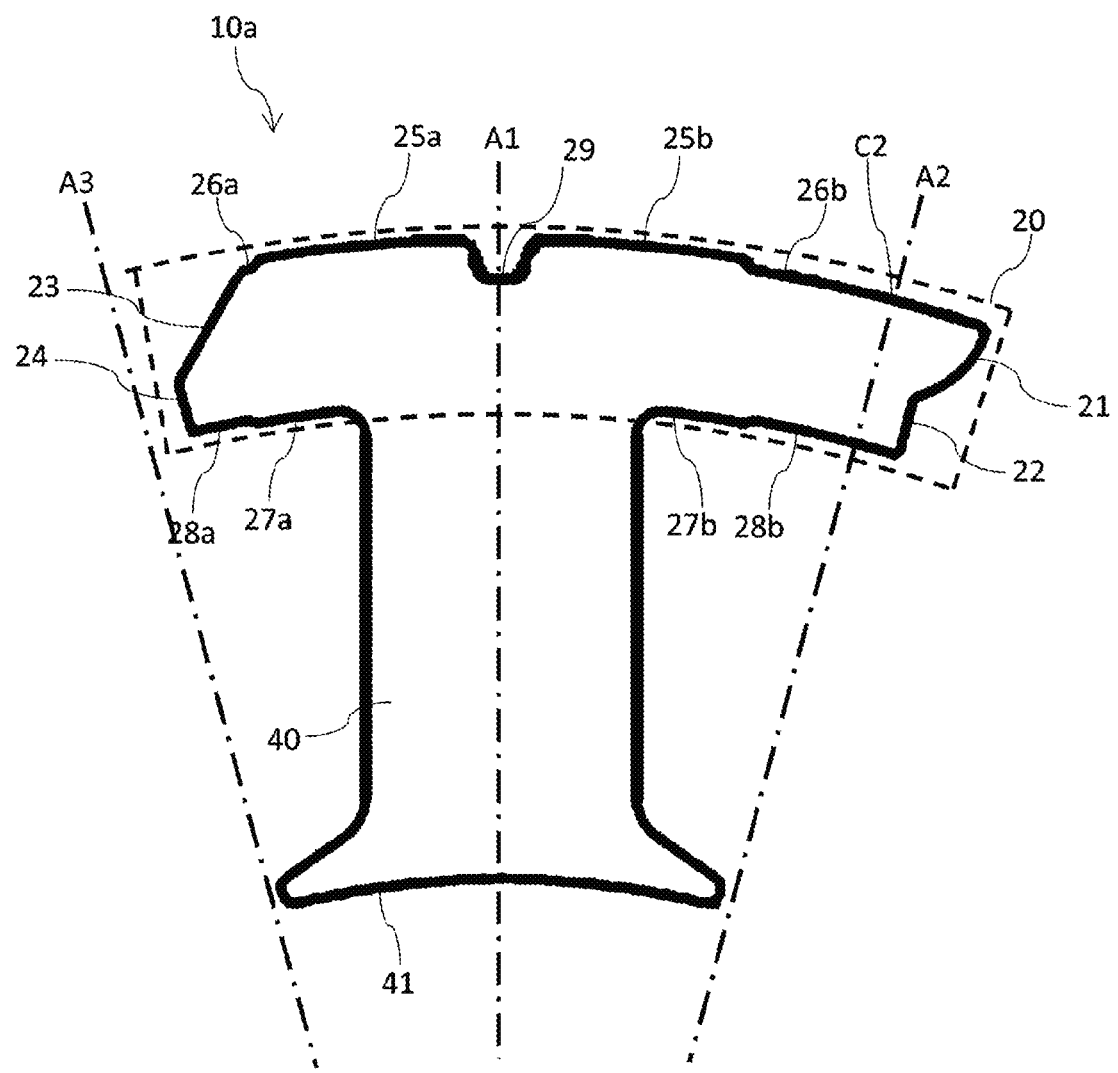
FIG. 2 is a plan view of a laminate member of a core piece according to an example embodiment of the present disclosure.
Figure 3:
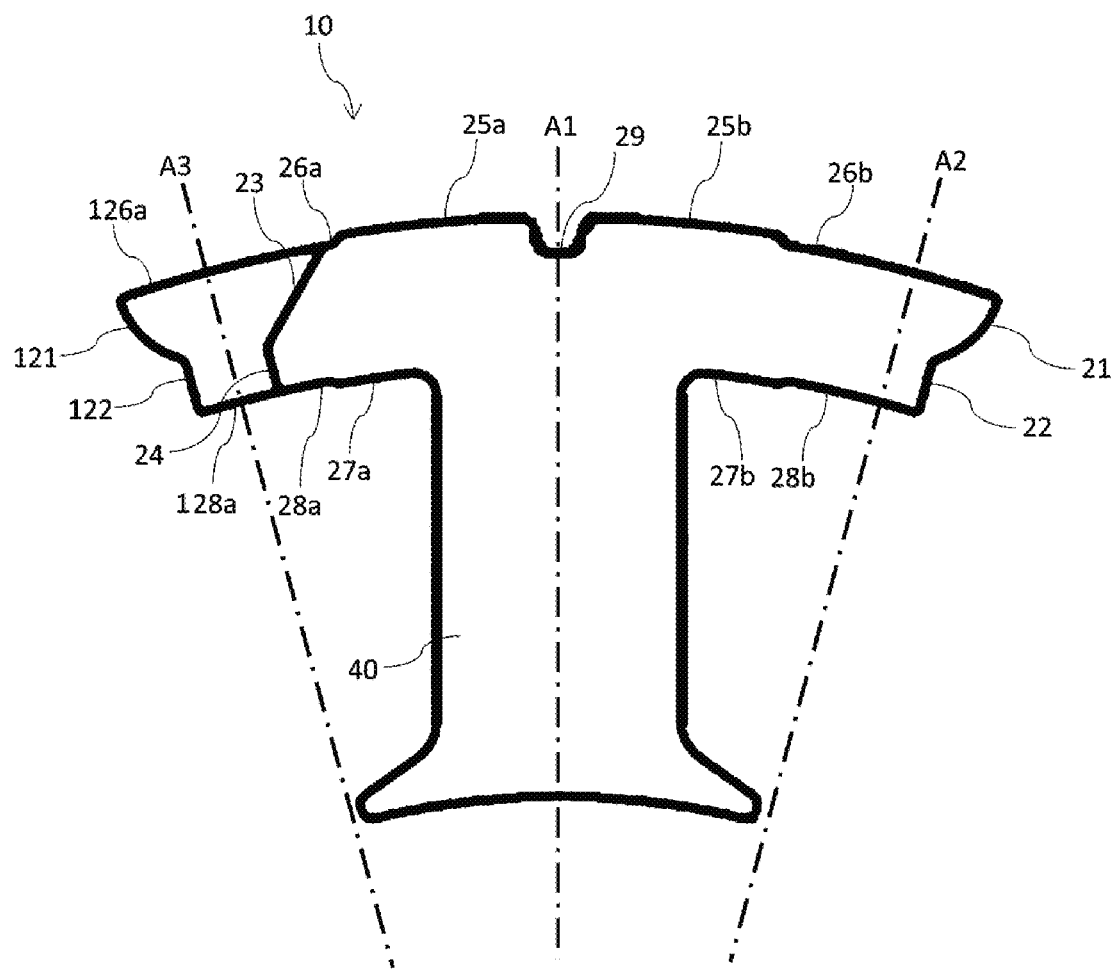
FIG. 3 is a plan view of laminate members of laminated core pieces according to an example embodiment of the present disclosure.
Figure 4:
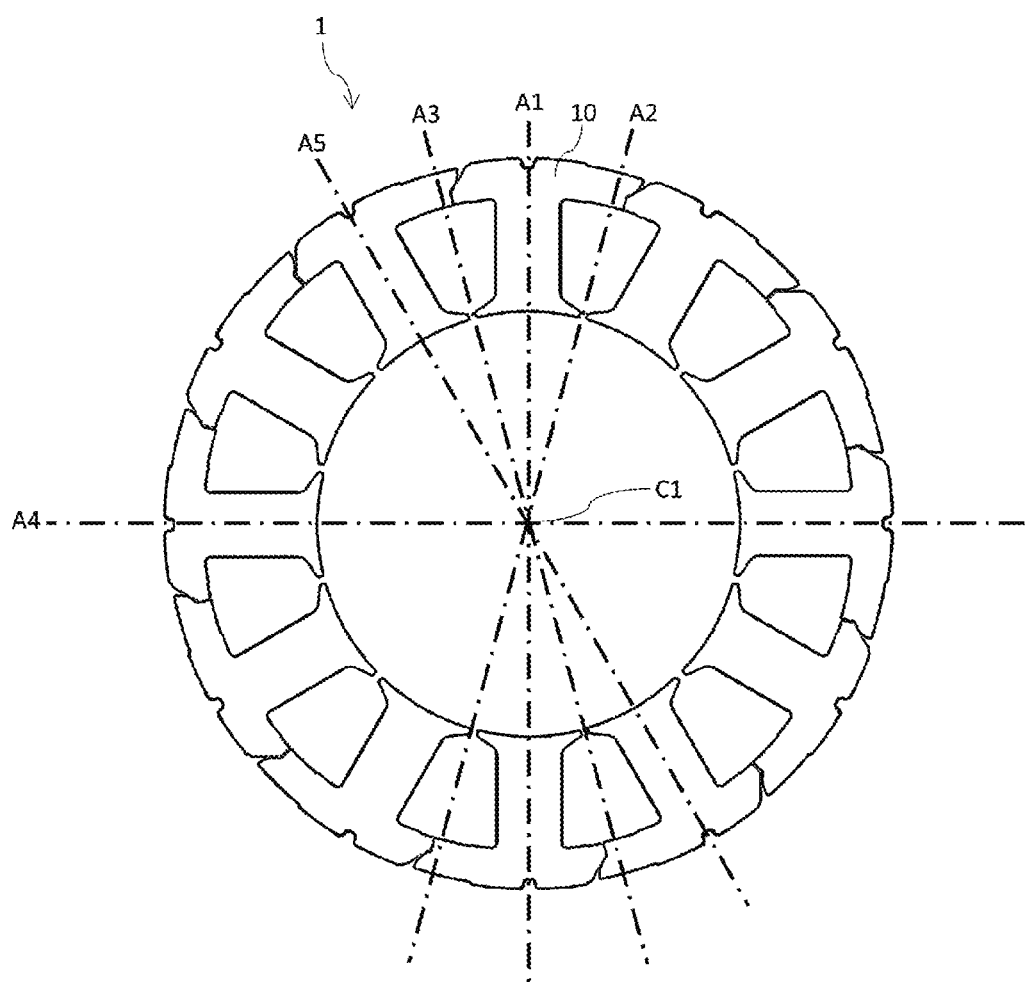
FIG. 4 is a plan view of annularly connected core pieces according to an example embodiment of the present disclosure.

FIG. 2 is a plan view of one laminate member 10a of a core piece 10 which defines the stator 83. FIG. 3 is a plan view of the laminated core pieces 10. FIG. 4 is a plan view of a core 1 in a state in which the core pieces 10 are annularly connected.

As shown in FIG. 4, a center point of a circle of an outer circumferential surface or an inner circumferential surface defined by the core 1 is C1. Straight lines A1, A2, and A3 shown in FIGS. 2 and 3 each are lines extending in a radial direction through the center point C1. An inner angle between the straight line A1 and the straight line A2 and an inner angle between the straight line A1 and the straight line A3 are preferably about 15°, for example. An inner angle between tooth portions 40 of adjacent core pieces 10 is preferably about 30°, for example. An inner angle between the tooth portions 40 of the adjacent core pieces 10, an inner angle between the straight lines A1 and A2, and an inner angle between the straight lines A1 and A3 vary according to the number of core pieces 10 forming the core 1. The core 1 according to the embodiment of the present invention preferably includes the twelve core pieces 10, and thus, as described above, each of the inner angles between the tooth portions 40 of the adjacent core pieces 10 is preferably about 30°. Further, the number of core pieces 10 of the core 1 may be arbitrarily changed as desired.

As shown in FIG. 2, the laminate member 10a of the core piece 10 includes the tooth portion 40 and the core back portion 20. The core piece 10 is formed by laminating the plurality of laminate members 10a with a predetermined thickness. The tooth portion 40 is linearly symmetrical with respect to the straight line A1 passing through the center point C1. The tooth portion 40 has a shape in which an end on an inner side in a radial direction extends in a circumferential direction, and has an inner circumferential surface 41 on the inner side in the radial direction.

As shown in FIG. 3, one laminate member and another laminate member of the core piece 10 are laminated so that the tooth portion 40 does not protrude. Since circumferential lengths of one circumferential end of one laminate member and another circumferential end of another laminate member are different from each other, one side protrudes from another side.

The core back portion 20 is an element defining an annular portion of the core 1. The core back portion 20 is preferably connected with a radially outer side of the tooth portion 40 and has a shape extending in a circumferential direction.

The core back portion 20 includes a circular arc-shaped protrusion 21 and a radially straight portion 22 formed at one end thereof in the circumferential direction. The radially straight portion 22 has a shape of a straight line extending in a radial direction through the center point C1. The radially straight portion 22 protrudes outward of the straight line A1 in a circumferential direction. The circular arc-shaped protrusion 21 has a shape of protruding circumferentially outward of a radially straight line passing through the center point C1 and the radially straight portion 22. The circular arc-shaped protrusion 21 preferably has a circular arc shape partially overlapping a circle having a center that is an intersection point C2 between the straight line A2 and an outer circumferential recess 26b of the core back portion 20. An end on a circumferential inner side of the circular arc-shaped protrusion 21 is connected with an end on the circumferential outer side of the radially straight portion 22, and the circular arc-shaped protrusion 21 and the circumferential end of the radially straight portion 22 become one circumferential end of the core back portion 20.

Further, the circular arc-shaped protrusion 21 may not necessarily have a circular arc shape if so desired. For example, the core back portion 20 may be a protrusion with an arc shape of an ellipse or a gently curved protrusion instead of the circular arc-shaped protrusion 21. But a portion corresponding to the circular arc-shaped protrusion 21 of one end of the core back portion 20 is in contact with a contact portion 23 of an adjacent core piece at one point.

The core back portion 20 includes the contact portion 23 and a radially straight portion 24 provided at the other end thereof in the circumferential direction. Like the radially straight portion 22, the radially straight portion 24 preferably has a shape extending in a radial direction through the center point C1. Unlike the radially straight portion 22, the radially straight portion 24 has a shape of being recessed circumferentially inward of the straight line A3. The contact portion 23 preferably has a straight shape with an inclined surface recessed circumferentially inward of the radially straight portion 24. An inner angle between the radially straight portion 22 and the contact portion 23 is preferably about 135°. An end on a circumferential inner side of the contact portion 23 is connected with an end on a circumferential outer side of the radially straight portion 24, and the contact portion 23 and one circumferential end of the radially straight portion 24 become the other circumferential end of the core back portion 20.

Figure 5:
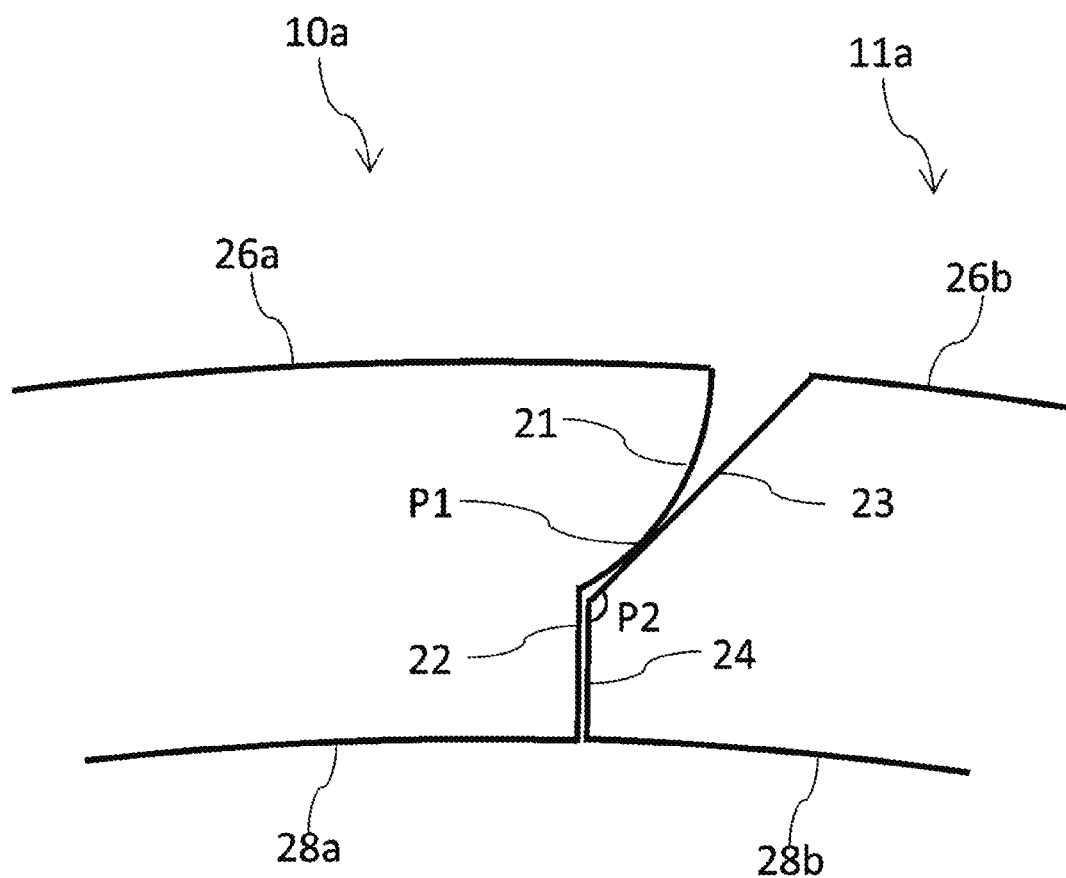
FIG. 5 is an enlarged view of a connection portion of adjacent core pieces according to an example embodiment of the present disclosure.

FIG. 5 is an enlarged view of a connection portion of laminate members 10a and 11a of the core pieces 10 and 11 adjacent to each other. As shown in FIG. 5, an inner angle P2 between the radially straight portion 24 and the contact portion 23 is preferably about 135°.

Further, the contact portion 23 may not necessarily have a straight line shape. For example, the contact portion 23 may be a shape of a circular arc-shaped protrusion or recess or a curved part. But a portion corresponding to the contact portion 23 of the other end of the core back portion 20 is in contact with the circular arc-shaped protrusion 21 of the adjacent core piece at one point. The contact portion 23 refers to a linear recess as a representation corresponding to the circular arc-shaped protrusion.

As shown in FIG. 5, one end of the laminate member 10a of the core piece 10 is preferably in contact with the other end of the laminate member 11a of the adjacent core piece 11. Specifically, the circular arc-shaped protrusion 21 of the core piece 10 and the contact portion 23 of the core piece 11 are in contact with each other at one contact point P1. The radially straight portion 22 of the core piece 10 and the radially straight portion 24 of the core piece 11 are spaced apart from each other. But the radially straight portion 22 of the core piece 10 and the radially straight portion 24 of the core piece 11 are not necessarily spaced apart from each other and may be in contact with each other.

As described above, in the core piece 10 and the core piece 11 which are adjacent to each other, the circular arc-shaped protrusion 21 of the laminate member 10a of the core piece 10 and the contact portion 23 of the laminate member 11a of the core piece 11 are in contact with each other at one point. When the core piece 10 rotates outward of the radial direction with respect to the core piece 11, the radially straight portion 22 and the radially straight portion 24 are not in contact with each other, but the circular arc-shaped protrusion 21 and the contact portion 23 are in contact with each other at one point. Even when the core piece 11 and the core piece 10 relatively rotate, the core piece 10 and the core piece 11 are in contact with each other at one point, and thus a frictional resistance between the core piece and the core piece 11 decreases. Therefore, compared to a configuration in which core pieces adjacent to each other are in surface contact with each other or in contact with each other at a plurality of points as in the conventional art, the core pieces can rotate while connected with each other.

Further, when the core piece 10 rotates with respect to the core piece 11, a center of rotation is a center C2 of a circular arc of the circular arc-shaped protrusion 21. In the laminate members of the core piece 10, since the center C2 coincides with a lamination direction, the core piece 10 may smoothly rotate about the center C2 as an axis.

Further, in the laminate members 10a and 11a of the core pieces 10 and 11, an inner angle between the radially straight portion 24 and the contact portion 23 is 135°, and thus the core piece 10 may rotate within a wide range when rotating with respect to the core piece 11 while being in contact with the core piece 11 at one point. Further, the inner angle P2 is not necessarily limited to preferably about 135° and may be changed within a range of about 130° to about 140°. Even when the inner angle P2 is an arbitrary angle in a range of about 130° to about 140°, the core pieces can be rotated in a sufficiently wide range while being in contact with each other at one point.

An outer circumferential surface of the core back portion 20 is engaged with a housing (not shown) when a motor is assembled. The core back portion 20 includes a central recess 29, outer circumferential surfaces 25a and 25b, and outer circumferential recesses 26a and 26b provided at an outer circumferential portion thereof.

The central recess 29 is incised inward in the radial direction at a position at which an outer circumferential surface of the core back portion 20 and the straight line A1 intersect with each other. The central recess 29 extends in a groove shape in a vertical direction in which the laminate members are laminated.

Each of the outer circumferential surfaces 25a and 25b preferably has a circular arc shape including a center that is the center point C1. The outer circumferential surfaces 25a and 25b are connected with both circumferential sides of the central recess 29. The outer circumferential surfaces 25a and 25b are portions which are in contact with the inner circumferential surface of the housing while the stator including the core 1 around which the conductive wire is wound is engaged with an inner side of the housing.

The outer circumferential recesses 26a and 26b are connected with circumferential end sides on the outer circumferential surfaces 25a and 25b. The outer circumferential recesses 26a and 26b are recessed from the outer circumferential surfaces 25a and 25b inward in a radial direction. The outer circumferential recesses 26a and 26b include a circular arc shape having a smaller diameter than that of the outer circumferential surfaces 25a and 25b and having the center point C1 the same as that of the outer circumferential surfaces 25a and 25b. When the stator is fitted to an inner side of the housing, the outer circumferential recesses 26a and 26b are not in contact with an inner circumferential surface of the housing, and thus gaps are defined between the inner circumferential surface of the housing and the outer circumferential recesses 26a and 26b.

The outer circumferential surface of the core back portion 20 of the core piece 10 is preferably engaged with the housing as a stator, as described above, the outer circumferential surfaces 25a and 25b are in contact with an inner circumferential surface of the housing, and the central recess 29 and the outer circumferential recesses 26a and 26b are not in contact with the inner circumferential surface of the housing. Therefore, accuracy of a size of the outer circumferential surface of the core back portion 20 increases. Further, the core back portion 20 may not necessarily have the outer circumferential recesses 26a and 26b. When the core back portion 20 has a shape having the outer circumferential recesses 26a and 26b, dimensions of the outer circumferential surfaces 25a and 25b more effectively increase.

The core back portion 20 preferably includes inner circumferential surfaces 27a and 27b and inner circumferential recesses 28a and 28b provided on an inner circumferential surface thereof. The inner circumferential surfaces 27a and 27b have a circular arc shape having a center that is the center point C1. The inner circumferential surfaces 27a and 27b are connected with both circumferential sides of the tooth portion 40. The inner circumferential recesses 28a and 28b are connected with circumferential end sides of the inner circumferential surfaces 27a and 27b. The inner circumferential recesses 28a and 28b are recessed from the inner circumferential surfaces 27a and 27b outward in the radial direction. The inner circumferential recesses 28a and 28b preferably include a circular arc shape having an inner diameter smaller than that of the inner circumferential surfaces 27a and 27b having the center that is the center point C1 the same or substantially the same as that of the inner circumferential surfaces 27a and 27b.

As shown in FIG. 3, when the core piece 10 including a plurality of laminate members which are laminated is viewed from above, since positions of both circumferential ends of the core back portion 20 are different from each other among the laminate members, the laminate member disposed on a lower side is partially shown. When viewed from above, a circular arc-shaped protrusion 121, a radially straight portion 122, an outer circumferential recess 126a, and an inner circumferential recess 128a of the laminate member disposed below the laminate member disposed on the top are shown at the contact portion 23, which is defined short in a circumferential direction of the core back portion 20, and a circumferential outer side of the radially straight portion 24. The circular arc-shaped protrusion 121, the radially straight portion 122, the outer circumferential recess 126a, and the inner circumferential recess 128a of the laminate members of the core piece 10 overlap an adjacent core piece in a lamination direction.

Figure 6:
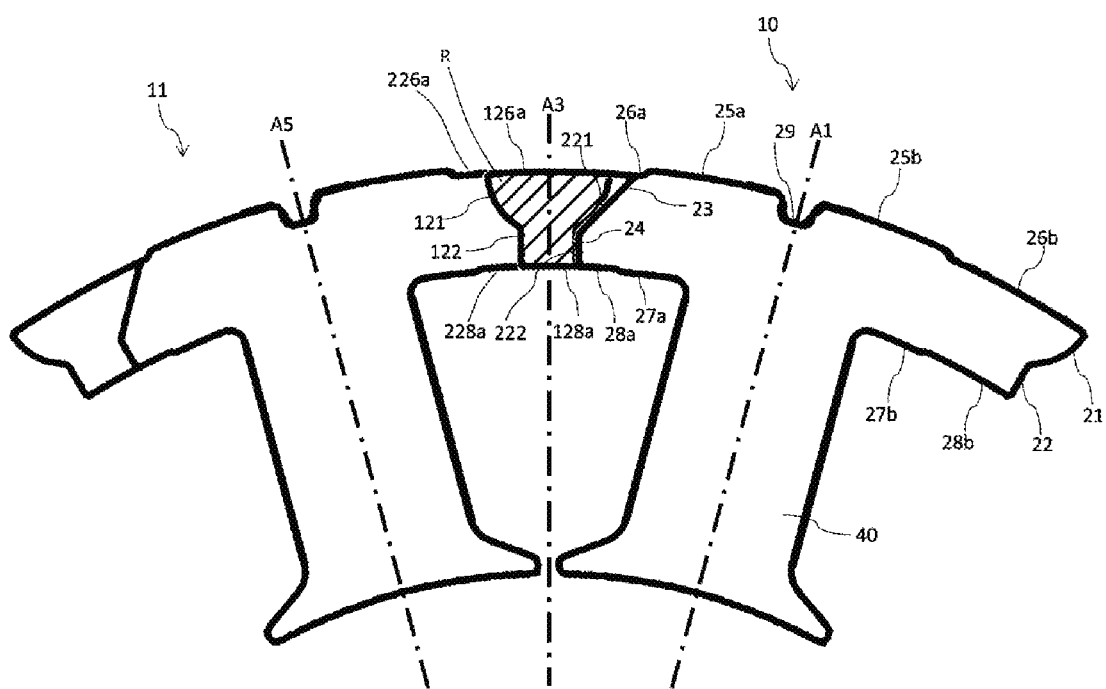
FIG. 6 is a view showing an area, in which core back portions of adjacent core pieces overlap each other in a lamination direction according to an example embodiment of the present disclosure.

FIG. 6 is a view showing the core back portions 20 of the core pieces 10 and 11 adjacent to each other overlap each other in a lamination direction, and particularly, a view showing an overlapping area. A circular arc-shaped protrusion 221, a radially straight portion 222, an outer circumferential recess 226a, and an inner circumferential recess 228a of the laminate member of the core piece 11 are preferably laminated on the circular arc-shaped protrusion 121, the radially straight portion 122, the outer circumferential recess 126a, and the inner circumferential recess 128a of the laminate member of the core piece 10. The laminate member of the core piece 10 is disposed under the laminate member of the core piece 11. As shown in FIG. 6 with inclined lines, the core piece 10 and the core piece 11 overlap in an area R. A boundary of the area R is determined by the circular arc-shaped protrusion 221, the radially straight portion 222, the outer circumferential recess 226a, and the inner circumferential recess 228a, which are laminate members of the core piece 11 positioned on an upper side, and the circular arc-shaped protrusion 121, the radially straight portion 222, the outer circumferential recess 226a, and the inner circumferential recess 228a, which are laminate members of the core piece 10 positioned on a lower side. But the outer circumferential recess 226a and the inner circumferential recess 228a, the outer circumferential recess 226a, and the inner circumferential recess 228a preferably overlap each other in the lamination direction.

For example, an area of the area R is greater than an area of a circumferentially cross-sectional area of the core back portion 20 at a position of the straight line A3. Further, the cross-section of the core back portion 20 is calculated by multiplying a circumferential length of the core back portion 20 and a thickness of the laminate member. The reason why the area R is formed as described above is as follows.

One circumferential end of each of the laminate members of the core piece 10 is in contact with the other circumferential end of each of the laminate members of the core piece 11 at one point. For this reason, as compared with when one circumferential end of the core piece 10 is in surface contact with the other circumferential end of the core piece 11, a magnetic path defined by circumferential ends of the core pieces 10 and 11 so that an amount of magnetic flux flowing therein is narrow. Therefore, the area greater than or equal to the magnetic path which is narrowed due to the area R is able to be secured. Further, since the radially straight portion 22 and the radially straight portion 24 are not in contact with each other in a circumferential direction in an assembled state, the magnetic path is not provided at a position at which the radially straight portion 22 and the radially straight portion 24 are in contact with each other.

Even when one circumferential end of the laminate member of the core piece 10 is not in contact with the other circumferential end of the laminate member of the core piece 11 adjacent thereto, is in surface contact therewith, or is in contact with at a plurality of points, the magnetic path is defined in the area R, and thus the magnetic property is improved.

Further, it is preferable that the area R be less than or equal to about 5 times the circumferential cross-sectional area of the core back portion 20. Therefore, an area in which the core back portions 20 of the adjacent core piece 10 overlap in the lamination direction is sufficiently secured, and thus a sufficient magnetic path is able to be secured. Further, because a frictional resistance is prevented from being excessively generated in the lamination direction of the core back portion 20 of the adjacent core piece 10, the adjacent core pieces are able to rotate in a manufacturing process.

Figure 7:
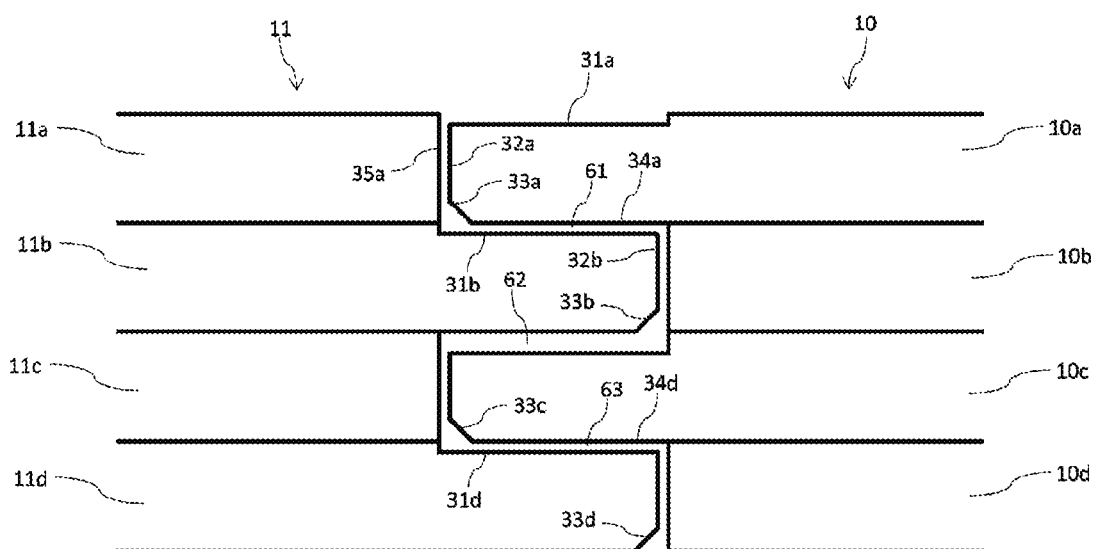
FIG. 7 is a cross-sectional view of a connection portion of adjacent core pieces according to an example embodiment of the present disclosure.

FIG. 7 is a cross-sectional view of the connection portion of the core pieces 10 and 11 adjacent to each other. As shown in FIG. 7, the core piece 10 is preferably defined by laminate members 10a to 10d which are laminated. The core piece 11 is preferably defined by laminate members 11a to 11d which are laminated. Ends of the core piece 10 and the core piece 11 face each other and preferably have uneven parts. The uneven part of the end of the core piece 10 is engaged and connected with the uneven portion of the end of the core piece 11.

An end 32a of the radially straight portion 22 or the circular arc-shaped protrusion 21 is preferably provided at a circumferential end of the laminate member 10a of the core piece 10. An end 35a of the radially straight portion 24 or the contact portion 23 is preferably defined at a circumferential end of the laminate member 11a of the core piece 11 to face the end 32a. An upper recess 31a, which is more recessed from an upper surface of a circumferential inner side of the core piece 10, is provided at an upper side of the circumferential inner side of the end 32a. A lower surface 34a is positioned under the circumferential inner side of the end 32a. An inclination 33a is provided between the end 32a and the lower surface 34a. When viewed from above, the inclination 33a is positioned at the circular arc-shaped protrusion 121 protruding from the upper laminate member in the circumferential direction, the radially straight portion 122, the outer circumferential recess 126a, and the inner circumferential recess 128a (see FIG. 6). The inclination 33a is preferably formed by a chamfering process in the manufacturing process, for example.

The laminate member of the core piece 10 is preferably formed by punching a plate member in the manufacturing process, for example. In this case, a burr protruding downward is formed on a lower surface of the laminate members. Since the burr causes interference in accurate lamination when the laminate members are laminated, the above-described chamfering is performed. Further, the inclination 33a is formed by the chamfering, and thus the core pieces are able to be smoothly rotated. Further, the lower side of the core piece 10 may be formed to have a curved shape instead of the inclination 33a.

A gap 61 may be defined between a lower surface 34a of the laminate member 10a and an upper recess 31b of the laminate member lib in a lamination direction. Similarly, a gap 62 is defined between the laminate member lib and the laminate members 10c, and a gap 63 is provided between the laminate member 10c and the laminate member 11d. The gaps 61, 62, and 63 preferably have a distance of greater than or equal to about 5 µm to less than or equal to about 20 µm so that magnetic paths are appropriately defined. Further, in order to form the more appropriate magnetic path, the gaps preferably have a distance of greater than or equal to about 5 µm to less than or equal to about 10 µm, for example.

The gaps 61, 62, and 63 preferably have long and short distances rather than the same distance. For example, in the present embodiment, the gaps 61 and 63 have a distance of about 5 µm, and the gap 62 has a distance of about 10 µm. An effective magnetic path is secured at a portion at which a distance in the lamination direction of the laminated portion of the adjacent core pieces is short, and a frictional resistance decreases at a portion at which a distance in the lamination direction is long. Therefore, when the effective magnetic path is provided, the magnetic property is secured, and the core pieces are able to be easily rotated in the manufacturing process.

Further, a lower recess is preferably provided on a lower side of a circumferential inner side of the circumferential end 32a of the laminate member 10a, similar to the upper recess 31a. Further, the lower recess may be provided on the laminate member 10a instead of the upper recess 31a.

A stator, a core, and a core piece of the present invention are not limited to the above-described embodiment, and various forms made based on the embodiment may be included. For example, the stator, the core, and the core piece of the present invention may be components having the modified embodiments described below. Further, the same components as those in the above-described embodiment will be designated with the same name or numeral references, and the description thereof may be omitted.

Figure 8:
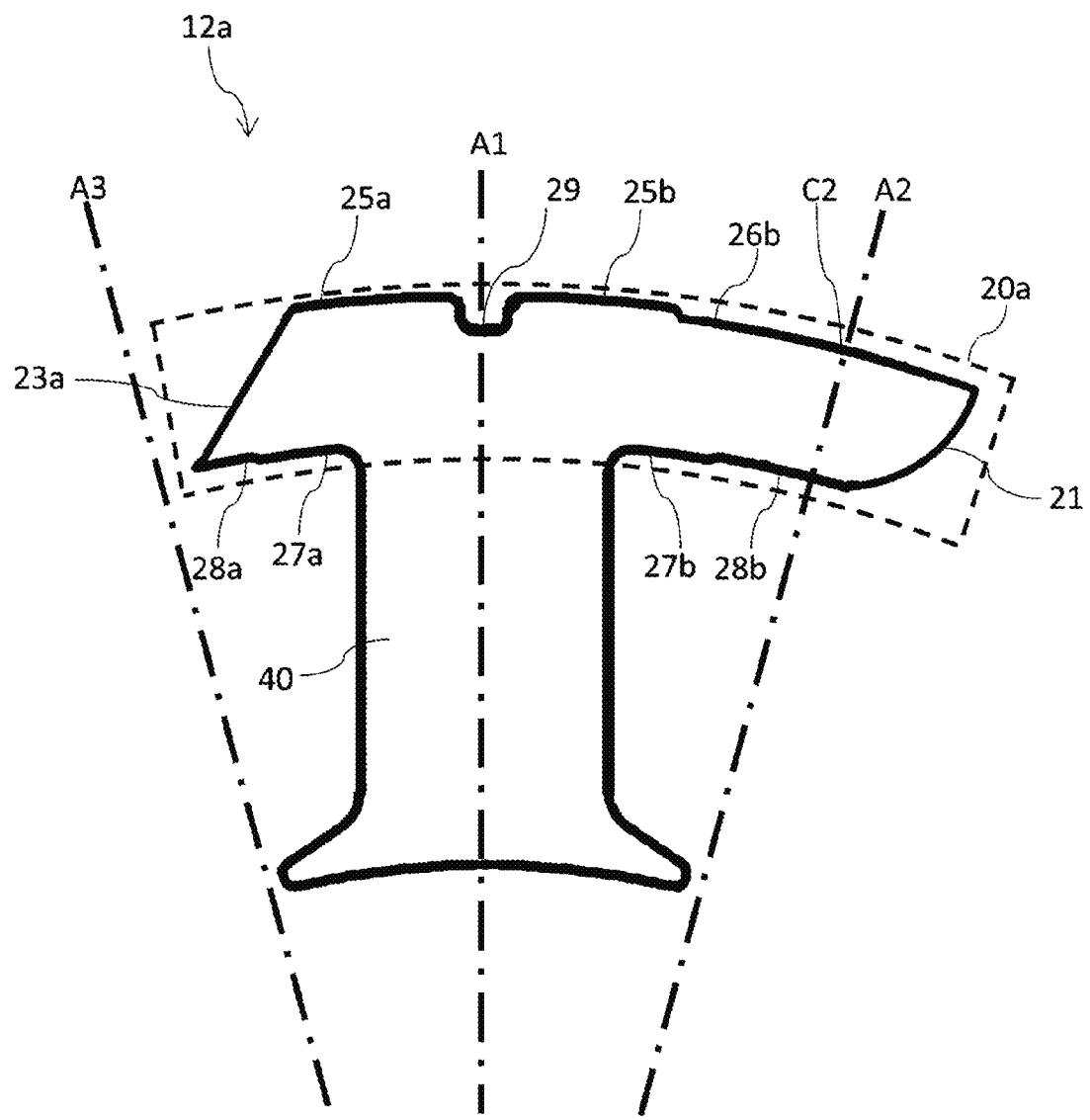
FIG. 8 is a plan view of a core piece according to a modified example embodiment of the present disclosure.

FIG. 8 is a plan view of laminate members 12a defining a core piece 12 as a modified embodiment according to the present invention. As shown in FIG. 8, the shapes of both circumferential ends of the laminate member 12a of the modification are different from those of the laminate member 10a (see FIG. 2) according to the above-describe preferred embodiment of the present invention.

Specifically, the laminate member 12a has a circular arc-shaped protrusion 21a provided at one circumferential end of the core back portion 20a thereof. The laminate members 12a has a contact portion 23a defined at the other circumferential end of the core back portion 20a. The laminate member 12a of the modification does not have radially straight portions defined at both ends thereof.

Even in the case of this configuration, ends in a circumferential direction of the adjacent core pieces are in contact with each other at one point, and the same effect as that of the above-described embodiment is obtained. The core piece 12 of the modification is used, and thus the laminate members of the core piece are able to be easily manufactured.

However, as described in the above-described embodiment, when the laminate member includes the radially straight paths 22 and 24, and one core piece is rotated in a direction in which an inner side in the radial direction gets close to the other core piece, the radially straight paths 22 and 24 come into contact with each other. Therefore, one core piece is able to prevented from rotating in a direction in which the radially inner side gets close to the other core piece.

Figure 9:
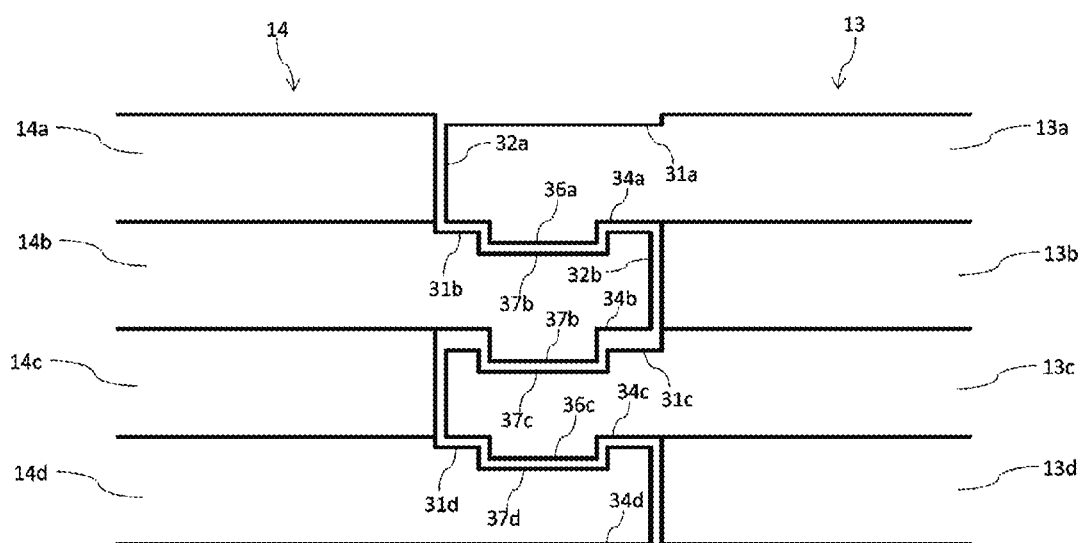
FIG. 9 is a cross-sectional view of a connection portion of core pieces according to a modified example embodiment of the present disclosure.

FIG. 9 is a cross-sectional view of a connection portion of core pieces 13 and 14 in a modified embodiment according to the present invention. As shown in FIG. 9, when compared to the core pieces 10 and 11 (see FIG. 7) according to the above-described embodiment, the core pieces 13 and 14 of the modification preferably have a different lamination shape in the vicinity of circumferential ends thereof.

Specifically, a lower protrusion 36a additionally protruding downward from a lower surface 34a is preferably defined on a lower side of a circumferential inner side of the end 32a of a laminate member 13a of the core piece 13. A second upper recess 37b, which overlaps the lamination member 13a in the lamination direction and is more recessed than the upper recess 31b, is provided at an upper side of a circumferential inner side of the end 32b of a laminate member 14b of the core piece 14. The lower protrusion 36a and the second upper recess 37b face each other in a lamination direction and are engaged with each other. Therefore, uneven portions engaged with each other are defined at a portion at which laminate members of the adjacent core pieces 13 and 14 overlap each other in the lamination direction, and thus the core piece 13 and the core piece 14 can be prevented from being separated.

Figure 11:
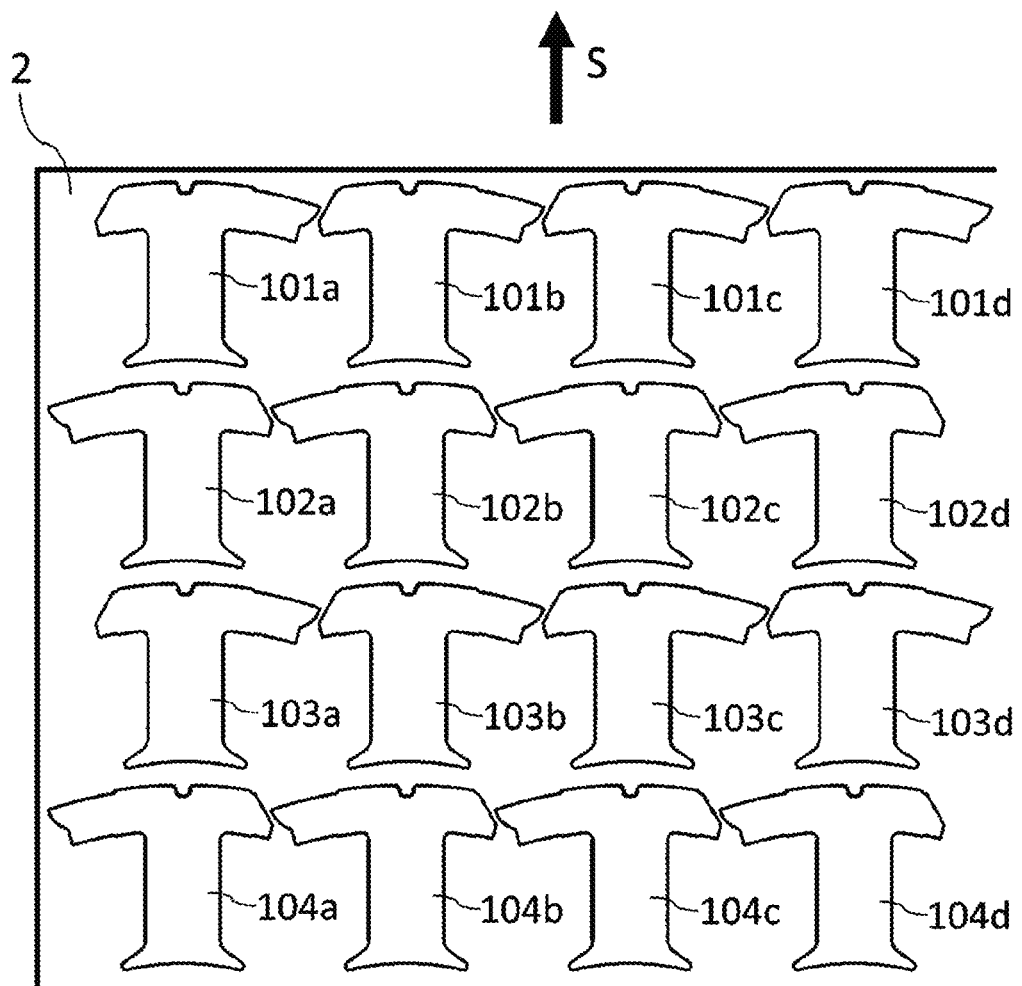
FIG. 11 is a view showing a laminate member formed on a plate member used in a process of manufacturing a stator according to an example embodiment of the present disclosure.
Figure 12:
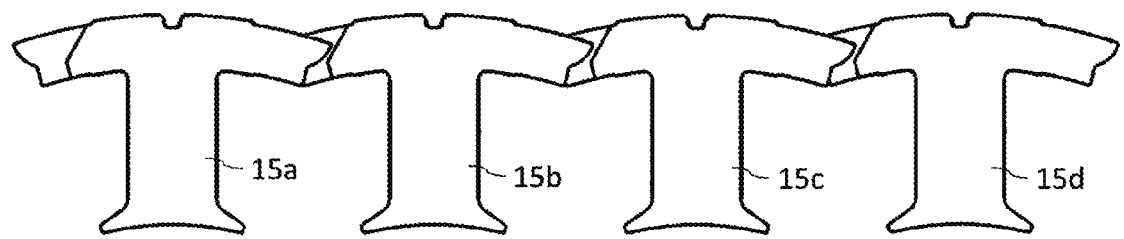
FIG. 12 is view showing laminate members of core pieces in the process of manufacturing a stator according to an example embodiment of the present disclosure.
Figure 13:
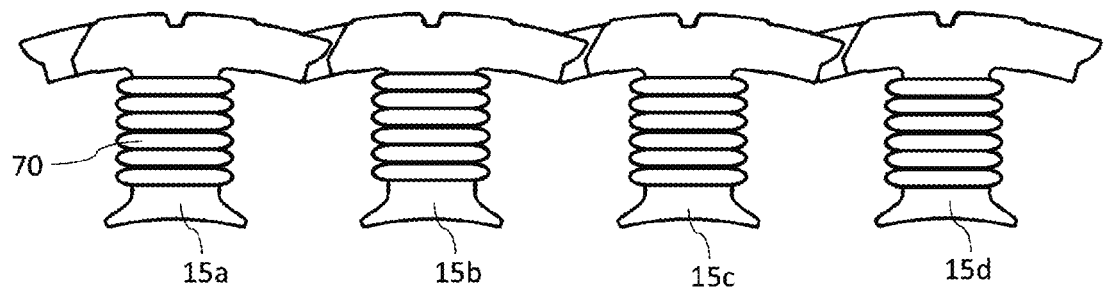
FIG. 13 is a view showing a divided stator having a coil formed by winding a conductive wire around teeth of a core piece in the process of manufacturing a stator according to an example embodiment of the present disclosure.

Next, a method of manufacturing a stator of an example embodiment of the present invention will be described with referent to FIGS. 10 to 13. Further, although the laminate members are arranged in a transverse direction of a plate member corresponding to number of annularly connected cores in practice, only a portion of them are shown in FIGS. 11 to 13, and the others are omitted for the sake of simplicity. Hereinafter, in a plane which is horizontal to a gravity direction, a direction horizontal to a transfer direction of the plate member refers to a "transverse direction."

Figure 10:
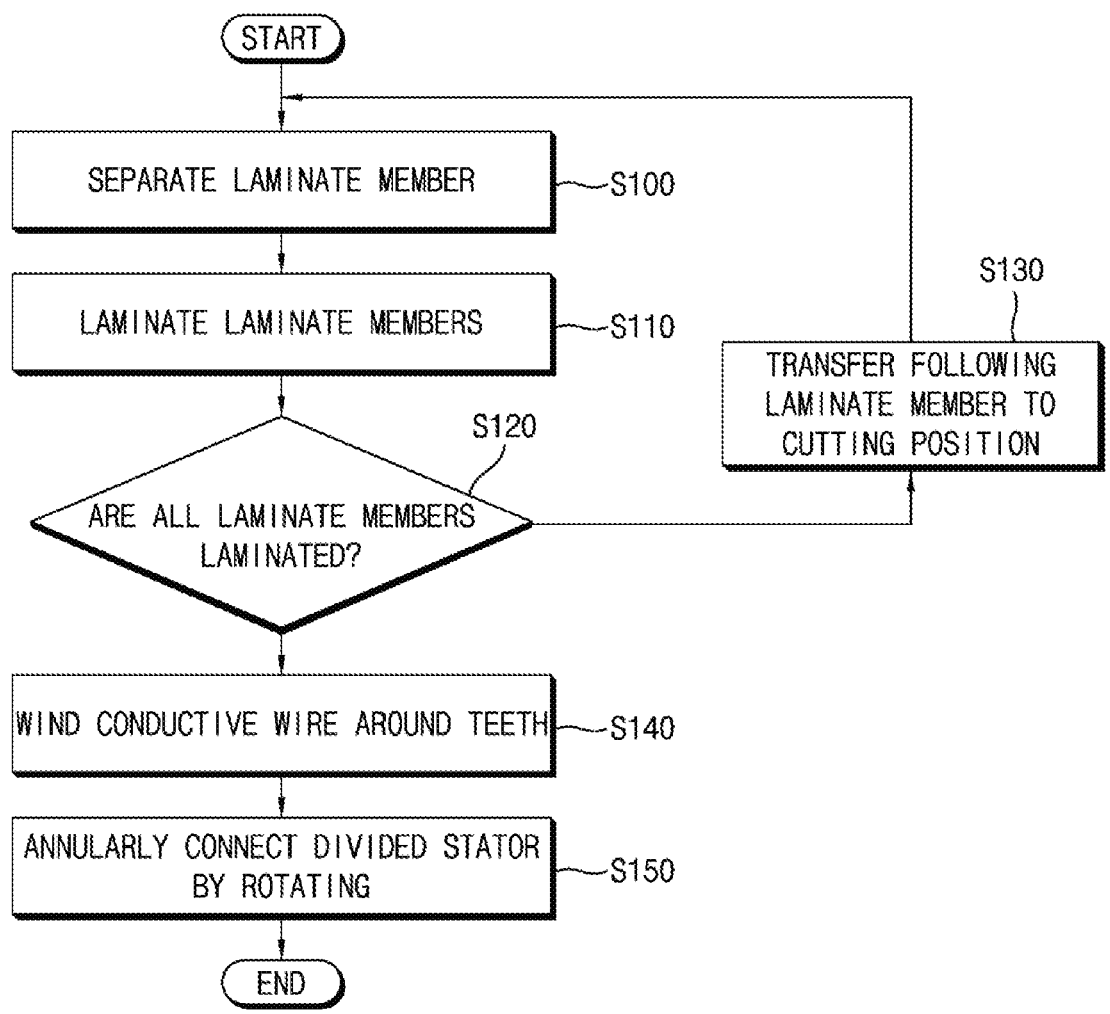
FIG. 10 is a flowchart showing a process of manufacturing a stator according to an example embodiment of the present disclosure.

FIG. 10 is a flowchart showing a process of manufacturing a stator according to an example embodiment of the present invention. In the process of manufacturing the stator, a process of separating a laminate member from a plate member, which is a base material, (S100) is performed first. When the laminate member is separated, the separated laminate member is laminated on the laminate member (S110).

FIG. 11 is a view showing laminate members 101a, 101b, 101c, 101d, 102a, 102b, 102c, 102d, 103a, 103b, 103c, 103d, 104a, 104b, 104c, and 104d of core pieces provided on a plate member 2. The laminate members 101a, 101b, 101c, and 104d are arranged in each lamination layer. The laminate members 101a, 101b, 101c, and 104d are arranged in a first layer, the laminate members 102a, 102b, 102c, and 102d are arranged in a second layer, the laminate members 103a, 103b, 103c, and 103d are arranged in a third layer, and the laminate members 104a, 104b, 104c, and 104d are arranged in a fourth layer, and thus the core piece is formed. In the process of separating the laminate members, the laminate members in the same layer are simultaneously or sequentially separated.

When all of the laminate members are not laminated (N of S120), the plate member 2 is transferred in a transfer direction S (see FIG. 11), then the laminate members to be laminated are transferred to a separation position (S130). For example, before separation of the laminate members 102a, 102b, 102c, and 102d in the second layer is performed, the laminate members 102a, 102b, 102c, and 102d formed on the plate member 2 are positioned right above the separated laminate members 101a, 101b, 101c, and 101d in the first layer. Further, a separation of the laminate members 102a, 102b, 102c, and is performed (S100) so that the laminate members 102a, 102b, 102c, and 102d are laminated on the laminate members 101a, 101b, 101c, and 101d.

FIG. 12 is a view showing core pieces in which laminate members are laminated in a process of manufacturing a stator. When all of the laminate members are laminated (Y of S120), as shown in FIG. 12, core pieces 15a, 15b, 15c, and 15d in which the laminate members are laminated are arranged in a transverse direction. In this state, conductive wires are wound around tooth portions 40 of the core pieces 15a, 15b, 15c, and 15d, and thus a coil 70 is formed (S140). When the conductive wires are wound around the tooth portions 40 of the core pieces 15a to 15d, the core pieces 15a, 15b, 15c, and 15d may be rotated in a direction in which tooth portions 40 of the adjacent core pieces are spaced apart from each other, and thus a wide space provided around the tooth portions 40 allows the conductive wires to be easily wound around the tooth portion 40. In this case, the circular arc-shaped protrusion 21 and the contact portion 23 of the adjacent core pieces are in contact with each other at one point, and the core pieces are rotated about a center C2 while changing a contact position. FIG. 13 is a view showing divided stators on which a coil 70 is formed by winding a conductive wire around tooth portions 40 of core pieces 15a, 15b, 15c, and 15d. When the conductive wires are wound around the tooth portions 40, the divided stators of the core pieces 15a to 15d around which the conductive wires are wound are rotated, and the core back portions 20 are annularly connected (S150). Thus, the stator having the core 1, on which the conductive wire is wound, shown in FIG. 4 is formed.

Further, the plate member 2 used in a manufacturing configuration may not be necessarily one plate member but may be two or more plate members if so desired.

As such, the embodiments and the modifications of the present invention have been described in detail. The above-descriptions are only exemplary and the present invention is not limited thereto and may be widely interpreted within the range in which those skilled in the art understand. For example, the above embodiments and each modification may be implemented in combination with each other.

Features of the above-described preferred embodiments and the modifications thereof may be combined appropriately as long as no conflict arises.

While preferred embodiments of the present invention have been described above, it is to be understood that variations and modifications will be apparent to those skilled in the art without departing from the scope and spirit of the present invention. The scope of the present invention, therefore, is to be determined solely by the following claims.

What is claimed is:

1. A stator, comprising:
    an annular core including a center that is a vertically extending central axis; and
    a conductive wire that is wound around the core; wherein
    the core includes core pieces in which at least a first laminate member and a second laminate member are respectively laminated;
    the first laminate member includes a first tooth portion extending in a radial direction and a first core back portion connected to a radially outer side of the first tooth portion and extending in a circumferential direction;
    the second laminate member includes a second tooth portion extending in the radial direction and a second core back portion connected to a radially outer side of the second tooth portion and extending in the circumferential direction;
    the first core back portion includes a first protrusion located on one side thereof in the circumferential direction and a first recess located on another side thereof in the circumferential direction;
    the second core back portion includes a second recess located on one side thereof in the circumferential direction and a second protrusion located on another side thereof in the circumferential direction;
    the first protrusion of one of the core pieces and the second protrusion of another one of the core nieces adjacent thereto overlay in a lamination direction of the annular core;
    a total area of a region in which the one of the core pieces opposes the another one of the core pieces in the lamination direction is greater than, but also less than about 5 times as large as, a circumferential cross sectional area of a radially outer side of the first tooth portion and the second tooth portion of the one of the core pieces.

2. The stator according to claim 1, wherein
    a third laminate member is further laminated on the core piece;
    the third laminate member includes a third tooth portion extending in the radial direction and a third core back portion extending in a circular arc shape from a radially outer position of the third tooth portion;
    the third core back portion includes a third protrusion on one side thereof in the circumferential direction and a third recess on another side thereof in the circumferential direction; and
    a distance between the first core back portion and the second core back portion of the core piece adjacent thereto in the lamination direction is different from a distance between the second core back portion and the third core back portion of the core piece adjacent thereto in the lamination direction.

3. The stator according to claim 1, wherein a distance between the first core back portion and the second core back portion of the core piece adjacent thereto in the lamination direction is greater than or equal to about 5 μm and less than or equal to about 20 μm.

4. The stator according to claim 1, wherein the first protrusion is in contact with the another one of the core pieces at one point.

5. The stator according to claim 4, wherein the second protrusion is in contact with the one of the core pieces at one point.

6. The stator according to claim 5, wherein each of the first protrusion and the second protrusion includes a circular arc shape.

7. The stator according to claim 6, wherein
    the first protrusion includes a circular arc shape with a center that is a position at which a bisector between a radial center line of the first tooth portion and a radial center line of the first tooth portion of the another one of the core pieces intersects with an outer circumferential surface of the first core back portion; and
    the second protrusion includes a circular arc shape with a center that is a position at which a bisector between a radial center line of the second tooth portion and a radial center line of the second tooth portion of the core piece adjacent thereto intersects with an outer circumferential surface of the second core back portion.

8. The stator according to claim 5, wherein
    the first core back portion further includes a first contact portion located at the another side thereof in the circumferential direction;
    the second core back portion further includes a second contact portion located at one side thereof in the circumferential direction;

the first protrusion is in contact with the first contact portion adjacent thereto at one point; and the second protrusion is in contact with the second contact portion adjacent thereto at one point.

9. The stator according to claim 8, wherein each of the first contact portion and the second contact portion has a straight line shape.

10. The stator according to claim 9, wherein the first core back portion includes a first radially straight portion extending in the radial direction on the one side thereof in the circumferential direction, and a second radially straight portion extending in the radial direction on the another side thereof in the circumferential direction; and the second core back portion includes a third radially straight portion extending in the radial direction on the one side thereof in the circumferential direction, and a fourth radially straight portion extending in the radial direction on the another side thereof in the circumferential direction.

11. The stator according to claim 10, wherein the first contact portion includes an inclined surface with an inclination greater than or equal to about 130° and less than or equal to about 140° with respect to the first radially straight portion; and the second contact portion includes an inclined surface with an inclination greater than or equal to about 130° and less than or equal to about 140° with respect to the third radially straight portion.

12. The stator according to claim 1, wherein the first core back portion includes an inclined or curved shape on a lower side of one side thereof in the circumferential direction or the other side thereof in the circumferential direction which overlaps the core piece adjacent thereto; and the second core back portion includes an inclined or curved shape on a lower side of the other side thereof in the circumferential direction or one side thereof in the circumferential direction which overlaps the core piece adjacent thereto.

13. The stator according to claim 1, wherein the first protrusion of the one of the core pieces includes a fourth protrusion protruding in the lamination direction or a fourth recess recessed in the lamination direction;

the second protrusion of the another one of the core pieces includes a fifth recess recessed in the lamination direction or a fifth protrusion protruding in the lamination direction; and the fourth protrusion and the fifth recess or the fourth recess and the fifth protrusion are engaged with each other.

14. The stator according to claim 1, wherein the first core back portion includes a first central recess incised inward in the radial direction at a position at which an outer circumferential surface and an extended line of the center line of the first tooth portion intersect each other, and the second core back portion includes a second central recess incised inward in the radial direction at a position at which an outer circumferential surface and an extended line of the center line of the second tooth portion intersect each other.

15. A motor comprising the stator according to claim 1.

* * * * *